(12) United States Patent
Miyanaga (10) Patent No.: US 7,891,444 B2
(45) Date of Patent: Feb. 22, 2011

(54) DRILL BIT

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 238 days.

(21) Appl. No.: 11/908,025

(22) PCT Filed: Mar. 7, 2005

(86) PCT No.: PCT/JP2005/003896

§ 371 (c)(1),
(2), (4) Date: Nov. 13, 2008

(87) PCT Pub. No.: WO2006/095403

PCT Pub. Date: Sep. 14, 2006

(65) Prior Publication Data

US 2009/0103994 A1   Apr. 23, 2009

(51) Int. Cl.
*E21B 10/36* (2006.01)
*B23B 51/00* (2006.01)

(52) U.S. Cl. .................. 175/415; 175/398; 175/389; 175/395; 175/420; 408/230

(58) Field of Classification Search ............... 175/415, 175/398, 389, 395, 420; 408/230
See application file for complete search history.

(56) References Cited

FOREIGN PATENT DOCUMENTS

| JP | 61-109606 | 5/1986 |
|----|-----------|--------|
| JP | 01-092019 | 4/1989 |
| JP | 07-112311 | 5/1995 |
| JP | 2001-179518 | 7/2001 |
| JP | 2002-178328 | 6/2002 |
| JP | 2004-338051 | 12/2004 |
| WO | WO-03/103914 | 12/2003 |

OTHER PUBLICATIONS

International Search Report for Application No. PCT/JP2005/003896, dated Jun. 7, 2005.

*Primary Examiner*—Giovanna C Wright
(74) *Attorney, Agent, or Firm*—Marshall, Gerstein & Borun LLP (57) ABSTRACT

A drill bit comprises a plurality of cutting blades arranged circumferentially, the cutting blades having a cutting edge formed by a connecting ridge line between a cutting face and a flank; and a tip formed by coupling radially inner ends of the cutting edges to each other at a center portion of a bit tip end, wherein at least one of the cutting blades has a first flank and a second flank, wherein the first flank has a blade tip side flank close to the cutting edge and a base end side flank formed on the base end side of the blade tip side flank, and wherein a tilt angle α1 of the blade tip side flank 3a is smaller than a tilt angle α2 of the base end side flank 3b which is tilted toward the axial direction.

7 Claims, 8 Drawing Sheets

DRILL BIT

TECHNICAL FIELD

The present invention relates to a drill bit, and particularly to a drill bit which is attached to a vibrating drilling device so as to be able to drill holes in stone, concrete, etc.

BACKGROUND ART

Conventionally, drilling holes in stone, concrete, etc. is done by attaching a drill bit made of cemented carbide or the like to a vibrating drilling device and by applying both rotation and vibration (strike) in an axial direction to the drill bit.

One example of the drill bit of this type is constructed such that a plurality of cutting blades are arranged in a circumferential direction of the drill bit, a connecting ridge line between a cutting face and a flank which are formed in each cutting blade acts as a cutting edge, and radially inner ends of the cutting edges are coupled to each other at a center portion of a bit tip end (see Patent Document 1).

Patent Document 1: Japanese Laid-Open Patent Application Publication No. 2002-178328

DISCLOSURE OF THE INVENTION

Problems to be Solved by the Invention

However, in the drill bit constructed as above, since the flank located on the rear side of the cutting edge is a single plane having a constant tilt angle from a radially inner end portion to a radially outer end, the radially outer end that is a free end is easily chipped in the case of causing the drill bit to strongly contact an object to be drilled, such as concrete, to carry out drilling operations. Meanwhile, in the case of reducing the tilt angle of the flank which is tilted toward an axial direction to prevent the radially outer end of a blade tip from getting chipped, an ability of crushing the object to be drilled, or the like when strongly contacting it deteriorates. As a result, the drill bit deteriorates in drilling performance. In addition, as described above, when the flank is a face whose tilt angle is not large, the flank projects toward the tip end side more than the cutting edge at a connecting portion between the flank and the cutting face located on the rear side of the flank in a rotational direction. Therefore, it is necessary to form a contacting face by cutting this portion, and the construction of the drill bit becomes complex due to a negative technical reason.

The present invention was made in view of these circumstances, and an object of the present invention is to provide a drill bit whose drilling performance does not deteriorate and whose radially outer end of the blade tip is never chipped.

Means for Solving the Problems

The above object of the present invention is achieved by a drill bit described below.

A drill bit according to the present invention comprises: a plurality of cutting blades arranged in a circumferential direction thereof, the cutting blades being each structured to have a cutting edge formed by a connecting ridge line between a cutting face and a flank thereof; and a tip end portion formed by coupling radially inner ends of the cutting edges to each other at a center portion of a bit tip end when viewed from bottom, wherein at least one of the cutting blades has a first flank at an outer circumference end portion thereof and a second flank at an inner circumference side portion thereof, wherein the first flank has a blade tip side flank close to the cutting edge and a base end side flank formed on a base end side of the blade tip side flank, and wherein a tilt angle of the blade tip side flank which is tilted toward an axial direction is smaller than a tilt angle of the base end side flank which is tilted toward the axial direction.

With the above construction of the drill bit, the radially outer end portion of the blade tip can be increased in rigidity, and therefore, it is possible to realize that the radially outer end portion is not substantially chipped. In addition, efficient drilling can be carried out by causing the second flank tilted toward the axial direction and located on the radially inner side of the first flank to have a tilt angle, the tilt angle being set in view of a drilling efficiency (tilt angle set by emphasizing only the drilling efficiency (this tilt angle generally becomes larger than that on a radially outer side portion)). Then, since the tilt angle of the second flank can be set to be large, the connecting portion between the second flank and the cutting face adjacently located on the rear side of the second flank in the rotational direction can be set to be located more rearward toward the base end side in the axial direction than the cutting edge. Therefore, it is possible to realize such a construction that it is unnecessary to form a conventional connecting face for preventing the projection toward the tip end side.

Thus, in accordance with the drill bit of the present invention, it is possible to achieve mutually contradictory technical objects that are solving of chipping of the cutting blade and maintaining of high drilling efficiency, and it is also possible to avoid "the increase in complexity of the construction" caused due to the negative technical reason.

Then, when, in the above drill bit, the tilt angle of the second flank which is tilted toward the axial direction is set to be larger than each of the tilt angle of the blade tip side flank which is tilted toward the axial direction and the tilt angle of the base end side flank which is tilted toward the axial direction, it is possible to realize a preferred drill bit whose drilling efficiency is high and whose radially outer end portion is not substantially chipped.

Moreover, when, in the above drill bit, first ends of the blade tips, which are located on the radially inner side, are coupled to each other at a center of the bit tip end, it is possible to realize a preferred drill bit which, when drilling, can easily carry out positioning of a rotation center and can stably rotate about the rotation center.

Moreover, when, in the above drill bit, the cutting blade includes a plurality of main cutting blades and a plurality of sub cutting blades, and each of the main cutting blades includes the first flank and the second flank, the cutting and crushing of the sub cutting blades are carried out in addition to the cutting and crushing of the main cutting blades. Therefore, it is possible to realize a more efficient drill bit.

Moreover, when, in the above drill bit, the sub cutting blade is provided between the main cutting blades adjacent to each other in a rotational direction, and the sub cutting blade is provided at unequal intervals in the circumferential direction with respect to the main cutting blades located on both sides of the sub cutting blade, it is possible to drill holes having better roundness in the case of drilling holes using vibration.

Moreover, when, in the above drill bit, the sub cutting blade is provided so as to be located more rearward toward the base end side in the axial direction than the main cutting blade, concrete, stone, or the like crushed by the main cutting blade can be further crushed by the sub cutting blade. Therefore, it is possible to realize the drill bit whose hole drilling efficiency is further high.

Moreover, when, in the above drill bit, the radially inner end of the cutting edge of the sub cutting blade is located so as to be spaced apart from a center of the bit tip end toward the outer circumference when viewed from bottom, and a contacting face whose borders are defined by lines that are a ridge line formed by connecting the radially inner end of the cutting edge of the sub cutting blade and the center of the bit tip end when viewed from bottom, a concave line that is a connecting line between the contacting face and the cutting face of the main cutting blade adjacently located on a rear side of the contacting face in the rotational direction, and a line formed by connecting the radially inner end, that is one end of the ridge line, of the cutting edge of the sub cutting blade and the radially outer end of the concave line is formed at a portion which is located between two main cutting blades adjacent to each other in the rotational direction and which is located on a radially inner side portion of the sub cutting blade provided between the above two main cutting blades, the angle of the cutting face of the main cutting blade can be set to be larger than that of the flank of the main cutting blade. Therefore, it is possible to realize the drill bit whose cutting and crushing abilities are high.

Moreover, when, in the above drill bit, a material thereof is cemented carbide, it is possible to realize the drill bit whose drilling performance is preferable and whose durability is excellent.

EFFECTS OF THE INVENTION

In accordance with the drill bit of the present invention, it is possible to provide the drill bit whose drilling performance does not deteriorate and whose radially outer end of the blade tip is never chipped.

BRIEF DESCRIPTION OF THE DRAWINGS

FIG. 7 are views showing the tilt angles of respective flanks of the drill bit shown in FIGS. 1 to 6.

FIG. 14 are views showing the tilt angles of respective flanks of the drill bit shown in FIGS. 8 to 13.

EXPLANATION OF REFERENCE NUMBERS

A: drill bit
1: cutting blade
2: cutting face
3: flank
4: ridge line
10: tip end portion

BEST MODE FOR CARRYING OUT THE INVENTION

Hereinafter, embodiments of the present invention will be described with reference to the drawings.

Embodiment 1

Hereinafter, embodiments of a drill bit according to the present invention will be specifically described with reference to the drawings.

Figure 1:
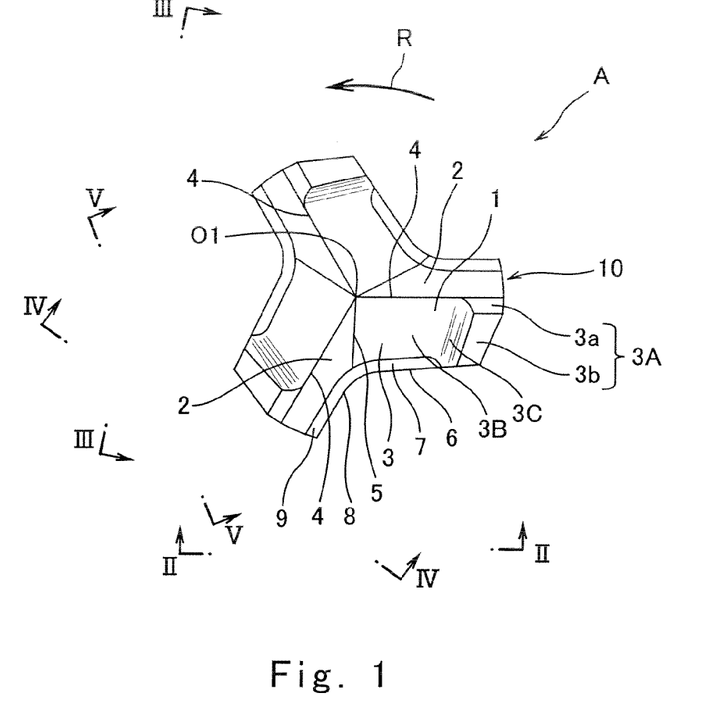
FIG. 1 is a bottom view showing a construction of a main part of a drill bit according to one embodiment of the present invention.
Figure 2:
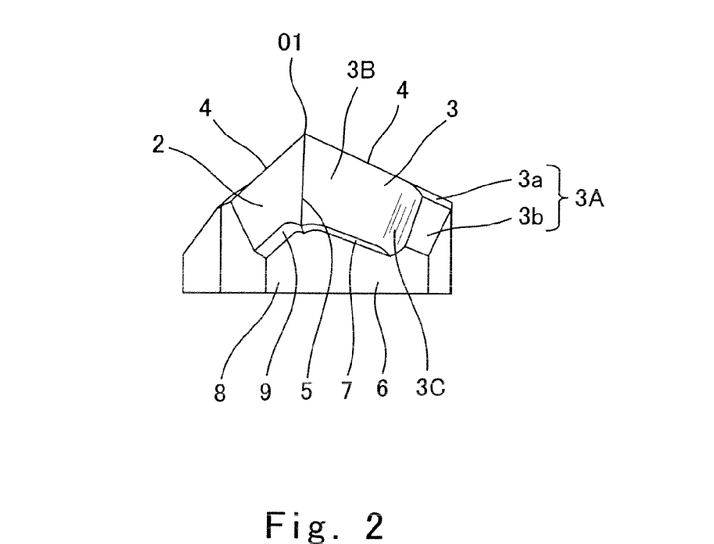
FIG. 2 is a side view of the above construction when viewed from a direction indicated by arrows II-II shown in FIG. 1.
Figure 3:
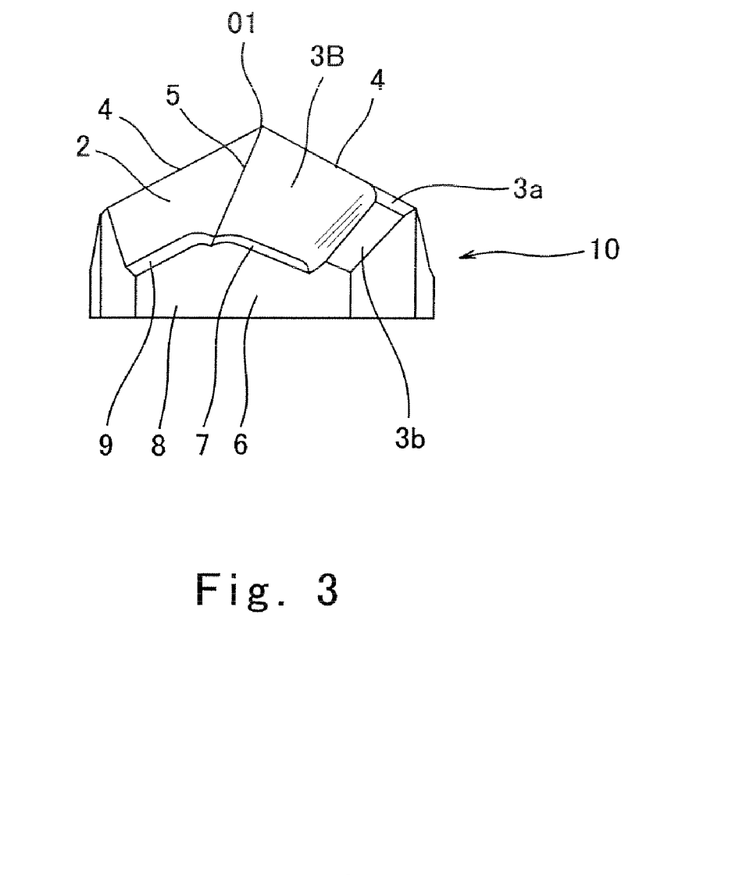
FIG. 3 is a side view of the above construction when viewed from a direction indicated by arrows III-III shown in FIG. 1.
Figure 4:
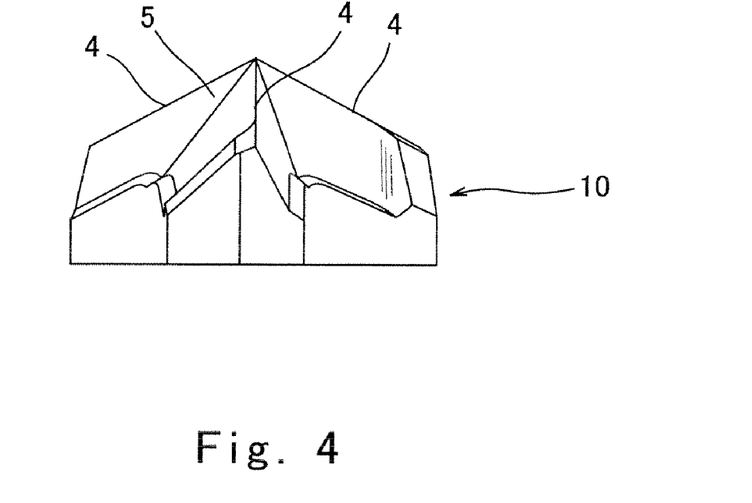
FIG. 4 is a side view of the above construction when viewed from a direction indicated by arrows IV-IV shown in FIG. 1.
Figure 5:
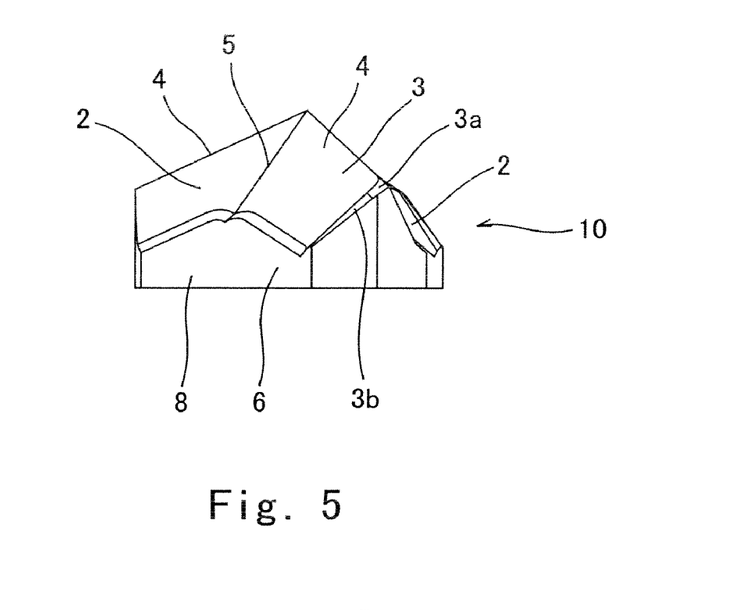
FIG. 5 is a side view of the above construction when viewed from a direction indicated by arrows V-V shown in FIG. 1.
Figure 6:
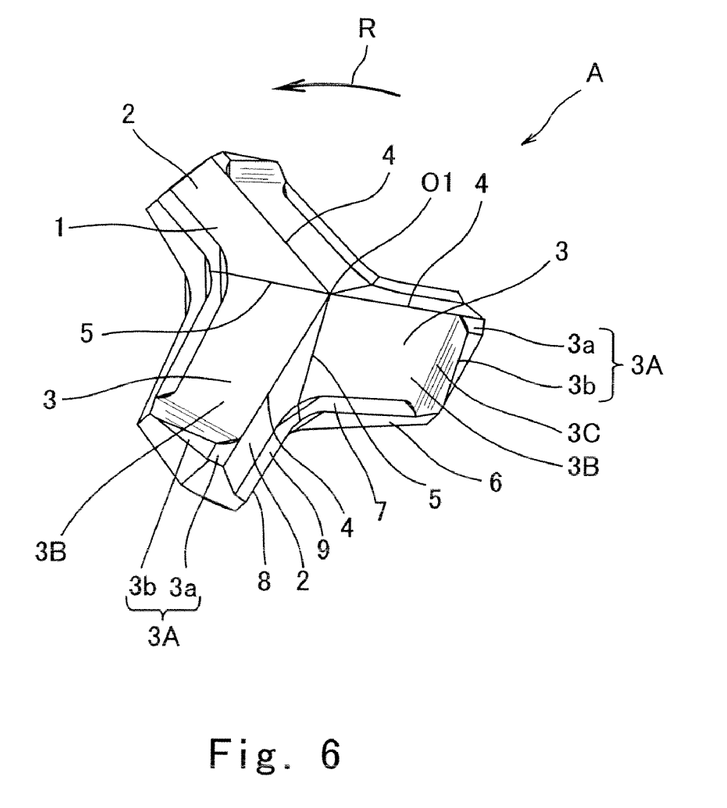
FIG. 6 is a perspective view showing a construction of a main part of the drill bit shown in FIGS. 1 to 5.

As shown in FIGS. 1 and 6, a tip end portion 10 of a drill bit A according to Embodiment 1 includes a plurality of cutting blades 1 (three cutting blades 1 in the present embodiment) arranged in a circumferential direction to extend substantially radially. Each cutting blade 1 includes a cutting face 2 formed on a front side in a rotational direction R when carrying out a drilling operation and a flank 3 adjacently formed on the rear side of the cutting face 2 in the rotational direction. The cutting blade 1 also includes a connecting ridge line 4 that is a ridge line formed by a connection between the cutting face 2 and the flank 3. Respective positions of the connecting ridge line 4 in a radial direction of the drill bit A are located at a tip end in an axial direction. Thus, the connecting ridge line 4 constitutes a cutting edge of the drill bit A.

First ends of the three connecting ridge lines 4, which are located on a radially inner side, are coupled to each other at a center O1 of the drill bit A when viewed from bottom, and the center O1 is the rotation center when carrying out the drilling operation. However, according to need, those first ends of the three connecting ridge lines 4 may be coupled to each other at a center portion of a bottom face of the drill bit A via a so-called "chisel edge".

As shown in FIGS. 1 to 6, the flank 3 of each of the three cutting blades 1 includes a first flank 3A at an outer circumference end portion (radially outer end portion) thereof and a second flank 3B on an inner circumference side (radially inner side) thereof. The first flank 3A and the second flank 3B are coupled to each other in the radial direction via a connection face 3C that is a curved face. Note that the connection face 3C does not have to be the curved face.

The first flank 3A includes a blade tip side flank 3a close to the cutting edge (connecting ridge line 4) and a base end side flank 3b formed on a base end side of the blade tip side flank 3a.

Figure 7:
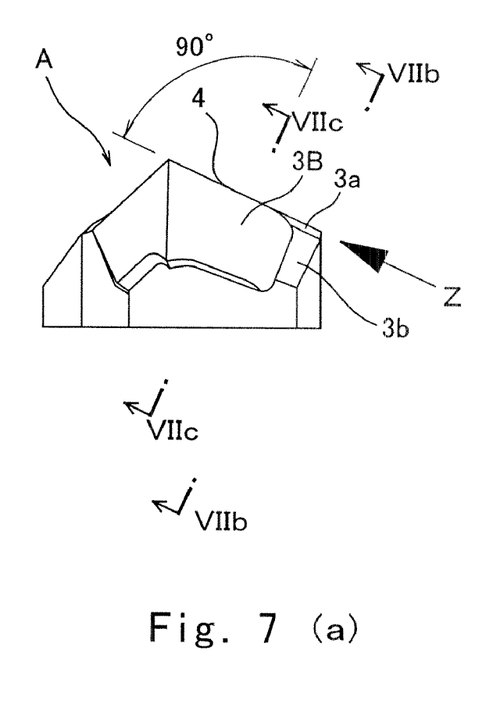
FIG. 7(a) is the same as FIG. 2 and is the side view of the above construction when viewed from a side of a flank orthogonal to a connecting ridge line.
FIG. 7(b) is a partially enlarged view showing tilt angles α1 and α2 of the flank when a cross section taken along line VIIb-VIIb shown in FIG. 7(a) is viewed from a direction indicated by an arrow Z (connecting ridge line direction)
FIG. 7(c) is a partially enlarged view showing a tilt angle α3 of the flank when a cross section taken along line VIIc-VIIc shown in FIG. 7(a) is viewed from the direction indicated by the arrow Z.

As shown in FIG. 7, the drill bit A is constructed such that a tilt angle α1 of the blade tip side flank 3a which is tilted toward the axial direction is smaller than a tilt angle α2 of the base end side flank 3b which is tilted toward the axial direction.

Moreover, in the present embodiment, a tilt angle α3 (see FIG. 7) of the second flank 3B which is tilted toward the axial direction is larger than each of the tilt angle α3 of the blade tip side flank 3a which is tilted toward the axial direction and the tilt angle α2 of the base end side flank 3b which is tilted toward the axial direction. However, the present embodiment is not limited to the above constructions, as long as the tilt angle α3 of the second flank 3B which is tilted toward the axial direction is larger than at least the tilt angle α1 of the blade tip side flank 3a which is tilted toward the axial direction. Therefore, the tilt angle α3 of the second flank 3B which is tilted toward the axial direction may be equal to or smaller than the tilt angle α2 of the base end side flank 3b which is tilted toward the axial direction.

Specifically, in the case of the drill bit for use in concrete (stone, etc.), the tilt angle α1 is set to approximately 23 degrees, the tilt angle α2 is set to approximately 45 degrees, and the tilt angle α3 is set to approximately 50 degrees. However, these tilt angles are set suitably depending on the use, use condition, material, etc. of the drill bit A.

Moreover, as shown in FIGS. 1 and 6, and FIGS. 2 to 5, connecting concave lines 5 corresponding to the connecting ridge lines 4 extend radially from the rotation center O1, the connecting concave lines 5 each being formed by the second flank 3B of one cutting blade 1 located on the front side in the rotational direction R and the cutting face 2 of another cutting blade 1 adjacently located on the rear side of that one cutting blade 1. When viewed from bottom, the connecting concave lines 5 and the connecting ridge lines 4 are disposed alternately in the rotational direction and extend radially.

Further, in order that a rear wall face 6 located on the rear side of the first flank 3A, the connection face 3C and the second flank 3B in the rotational direction is formed as a solid face in the radial direction at a connection portion formed at the base end of the tip end portion 10 of drill bit A, a rear adjustment face 7 is formed at a portion located on the base end side of from the second flank 3B to the connection face 3C.

Similarly, a front adjustment face 9 is formed which connects the cutting face 2, having an arbitrary angle, of the cutting blade 1 to a front wall face 8 which extends toward the base end of the drill bit A and is located on the front side in the rotational direction.

In the present embodiment, the tip end portion 10 of the drill bit A is formed of an integral block body, and its material is cemented carbide. Note that the tip end portion 10 of the drill bit A can, of course, also be made of a material other than cemented carbide.

Moreover, a shaft portion (not shown) of the drill bit is integrally fixed on the base end side (lower side in FIGS. 2 to 5) of the tip end portion 10 of the drill bit A, the shaft portion being provided with a discharge groove formed to extend circumferentially and an attaching portion (shank portion) to be attached to a drilling device.

The drill bit A according to the present embodiment constructed as above can provide the following operational advantages in the drilling operation.

To be specific, as described above, since, in the drill bit A, the tilt angle α1 of the blade tip side flank 3a which is tilted toward the axial direction is smaller than the tilt angle α2 of the base end side flank 3b which is tilted toward the axial direction, that is, since the tilt angle α1 of the blade tip side flank 3a which is tilted toward the axial direction is more obtuse than the tilt angle α2 of the base end side flank 3b which is tilted toward the axial direction, the outer end portion of the cutting edge is not substantially chipped even when an impact force is applied thereto in the drilling operation.

Moreover, since the tilt angle α3 of the second flank 3B and the tilt angle α2 of the base end side flank 3b of the first flank 3A are large, the present drill bit A can deliver a high drilling performance even though the cutting edge is configured not to be substantially chipped.

Further, since the tilt angle α3 of the second flank 3B can be set to be large, the connecting concave line 5 formed between the second flank 3B and the cutting face 2 located on the rear side of the second flank 3B in the rotational direction R can be realized as a single, simple line, and in addition, it is unnecessary to form a contacting face that has been necessary in a conventional drill bit due to a negative reason. On this account, it is possible to simplify the tip end portion 10 in contrast to conventional ones.

In addition, although the tip end portion 10 of the drill bit A of the present embodiment is constructed as above by a complicated combination of a comparatively large number of faces, the tip end portion 10 is formed of an integral block body, so that it can be manufactured with high production efficiency by casting, forging, or the like.

Embodiment 2

Next, another embodiment (Embodiment 2) of the present invention will be described with reference to FIGS. 8 to 14. In these drawings, a reference number obtained by adding 100 to the reference number used in Embodiment 1 is used for a component identical with or corresponding to that in Embodiment 1.

A tip end portion 110 of a drill bit A2 according to Embodiment 2 is constructed as follows.

Figure 8:
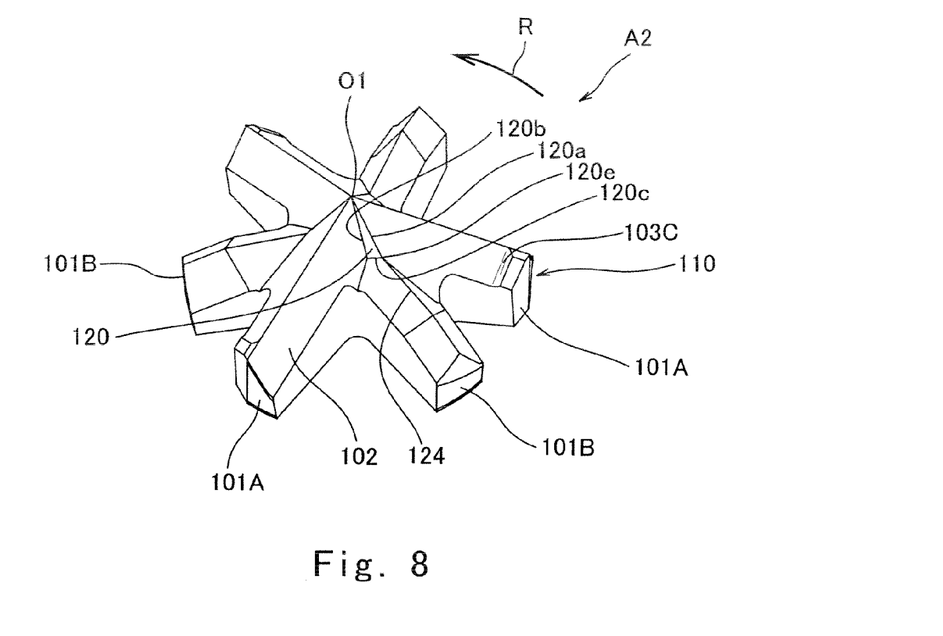
FIG. 8 is a perspective view showing a construction of a main part of a drill bit according to another embodiment (Embodiment 2).
Figure 9:
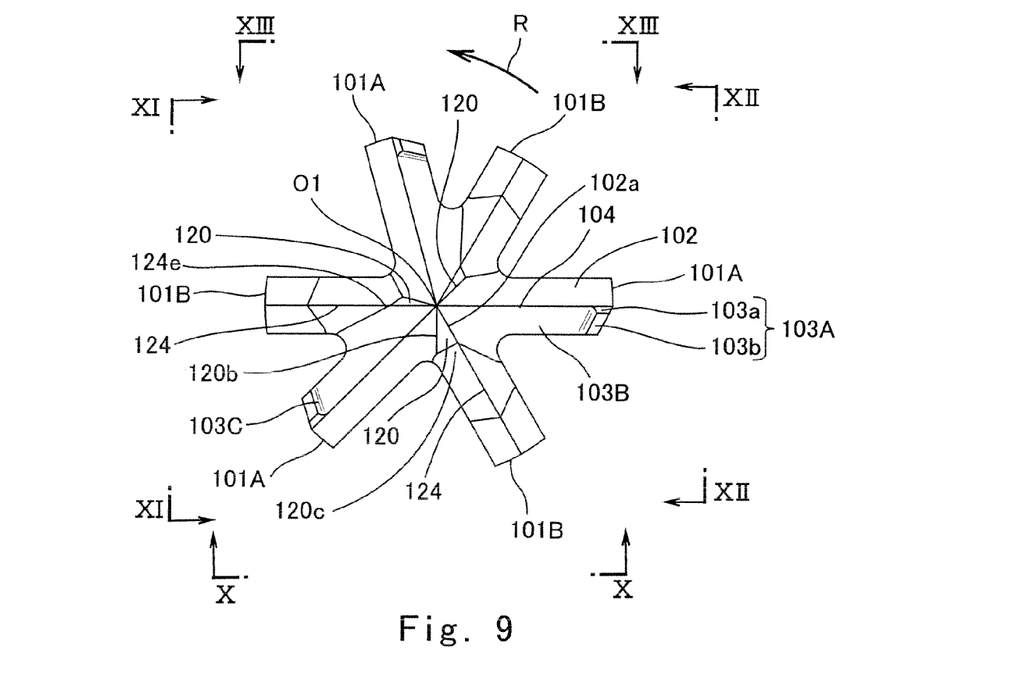
FIG. 9 is a bottom view showing the construction of the main part of the drill bit shown in FIG. 8.
Figure 10:
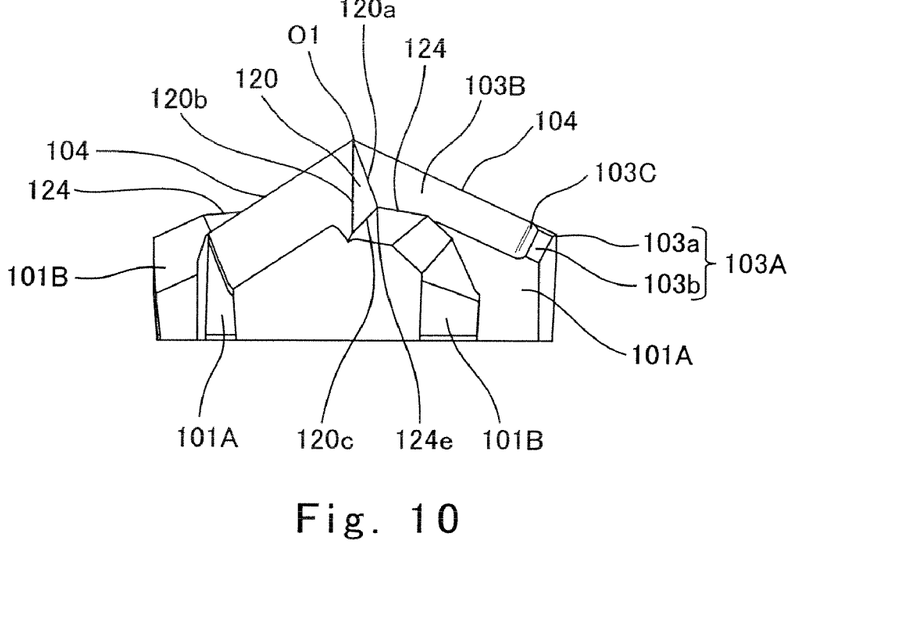
FIG. 10 is a side view of the above construction when viewed from a direction indicated by arrows X-X shown in FIG. 9.
Figure 11:
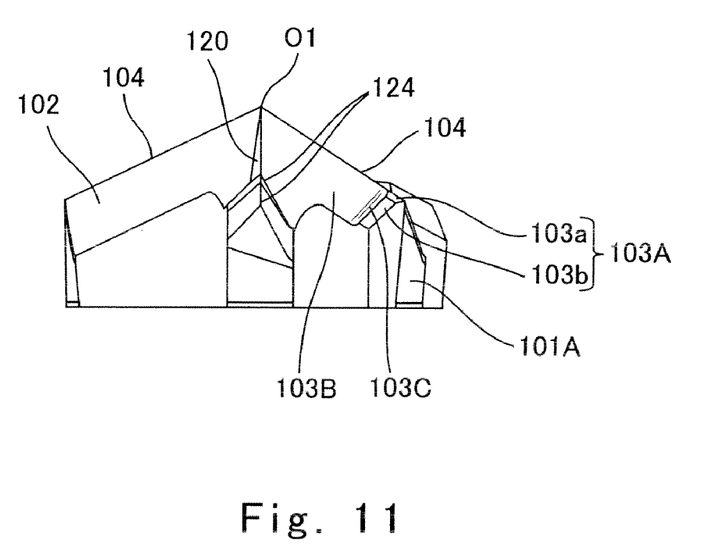
FIG. 11 is a side view of the above construction when viewed from a direction indicated by arrows XI-XI shown in FIG. 9.

In Embodiment 2, a plurality of main cutting blades 100A (three main cutting blades 101A in the present embodiment) are arranged in the rotational direction R to extend substantially radially, and each of sub cutting blades 101B is formed between adjacent main cutting blades 101A. In the present embodiment, the cutting blades are the main cutting blades 101A and the sub cutting blades 101B.

The sub cutting blade 101B is provided so as to be located more rearward than the main cutting blade 101A in a direction from the tip end (the center O1 in the present embodiment) toward the base end side. Therefore, the cutting edge (connecting ridge line 124) of the sub cutting blade 101B is located more rearward toward the base end side than the cutting edge (connecting ridge line 104) of the main cutting blade 101A in the axial direction.

In the present embodiment, a plurality of main cutting blades 101A (three main cutting blades 101A) are provided at unequal intervals in the circumferential direction. In contrast, the sub cutting blades 101B are provided at equal intervals (interval of 120 degrees) in the circumferential direction.

Moreover, the sub cutting blade 101B is provided at unequal intervals with respect to the main cutting blades 101A adjacently located on the front side and rear side of this sub cutting blade 101B in the rotational direction R. That is, each sub cutting blade 101B is provided so that an interval (arrangement angle) between the sub cutting blade 101B and the main cutting blade 101A adjacently located on the front side of this sub cutting blade 101B in the rotational direction R and an interval (arrangement angle) between the sub cutting blade 101B and the main cutting blade 101A adjacently located on the rear side of this sub cutting blade 101B in the rotational direction R are different from each other. However, although not shown, instead of the present embodiment, the main cutting blades 101A may be provided at equal intervals (interval of 120 degrees) in the circumferential direction, the sub cutting blades 101B may be provided at unequal intervals in the circumferential direction, and the sub cutting blade 101B may be provided at unequal intervals with respect to the main cutting blades 101A adjacently located on the front side and rear side of this sub cutting blade 101B in the rotational direction R. Alternatively, the main cutting blades 101A may be provided at equal intervals (interval of 120 degrees) in the circumferential direction, the sub cutting blades 101B may be provided at equal intervals (interval of 120 degrees) in the circumferential direction, and the sub cutting blade 101B may be provided at unequal intervals with respect to the main cutting blades 101A adjacently located on the front side and rear side of this sub cutting blade 101A in the rotational direction R.

A radially inner end 124e of the cutting edge (connecting ridge line 124) of the sub cutting blade 101B is located so as to be spaced apart from the center O1 of the bit tip end toward the outer circumference (radially outer side) when viewed from bottom.

A contacting face 120 is formed at a portion which is located between the cutting face 102 of one main cutting blade 101A and the second flank 103B of another main cutting blade 101A located on the front side of that one main cutting blade 101A in the rotational direction R and which is located on a radially inner side of the cutting edge (connecting ridge line 124) of the sub cutting blade 101B. In other words, the borders of the contacting face 120 are defined by a ridge line 120a formed by connecting the radially inner end of the cutting edge (connecting ridge line 124) of the sub cutting blade 101B and the center O1 of the bit tip end when viewed from bottom, a concave line that is a connecting line 120b between the contacting face 120 and the cutting face 102 of the main cutting blade 101A adjacently located on the rear side of the contacting face 120 in the rotational direction, and a line 120c formed by connecting the radially inner end (one end of the ridge line 120a) of the cutting edge (connecting ridge line 124) of the sub cutting blade 101B and the radially outer end of the concave line (connecting line 120b).

As above, in the present embodiment, in order to improve the cutting efficiency, a clearance angle of the second flank 103B of the main cutting blade 101A is set to be more acute-angled than a rake angle of the cutting face 102.

Figure 12:
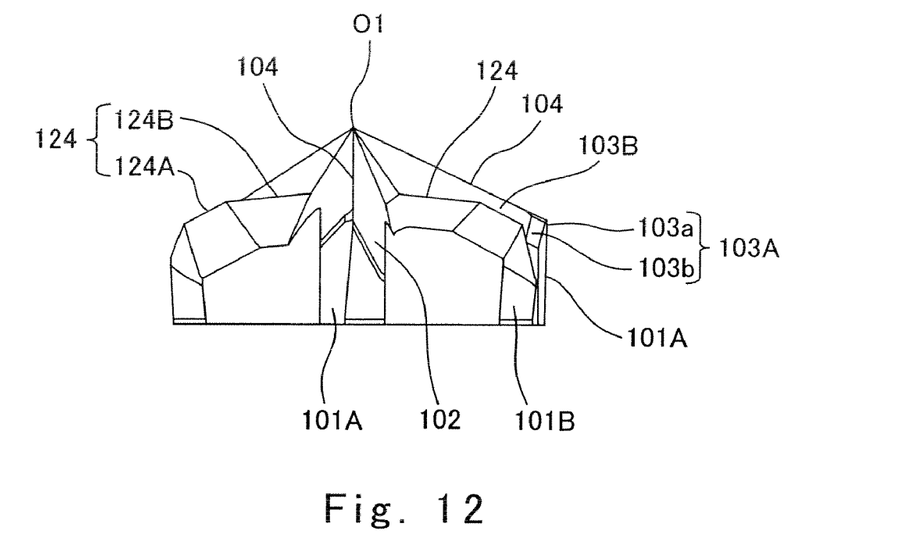
FIG. 12 is a side view of the above construction when viewed from a direction indicated by arrows XII-XII shown in FIG. 9.
Figure 13:
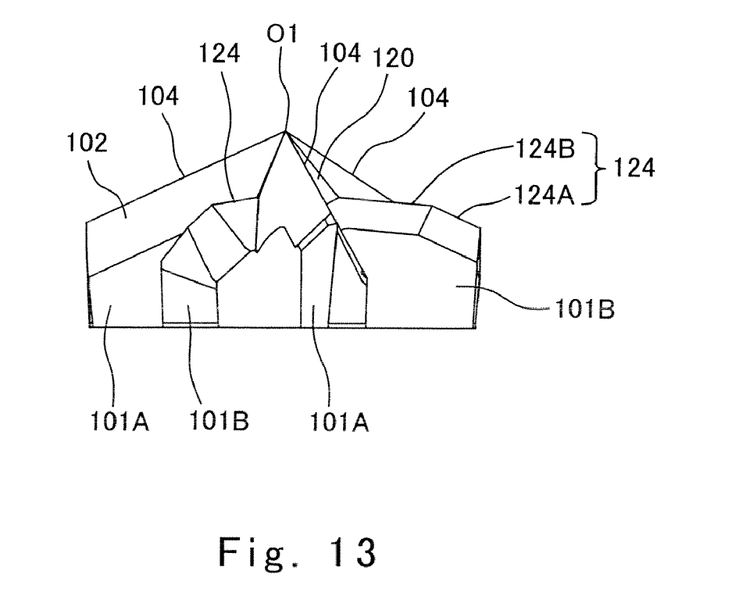
FIG. 13 is a side view of the above construction when viewed from a direction indicated by arrows XIII-XIII shown in FIG. 9.

Moreover, as clearly shown in FIGS. 12 and 13, the cutting edge (connecting ridge line 124) of the sub cutting blade 101B bends in a position thereof in the radial direction on a radially outer side toward the base end side, and the tilt angle of a radially outer side portion 124A of the cutting edge (connecting ridge line 124) toward the base end side is more acute-angled. In other words, the tilt angle of a radially inner side portion 124B of the cutting edge (connecting ridge line 124) is obtuse, and specifically, the radially inner side portion 124B is almost horizontal to obtain a high crushing ability.

Moreover, the main cutting blade 101A basically has the same construction as the cutting blade 1 (see FIG. 1) of Embodiment 1. That is, the main cutting blade 101A includes a cutting face 102 formed on a front side in the rotational direction R when carrying out the drilling operation and a flank 103 adjacently formed on the rear side of the cutting face 102 in the rotational direction. The main cutting blade 101A also includes a connecting ridge line 104 that is a ridge line formed by a connection between the cutting face 102 and the flank 103. Respective positions of the connecting ridge line 104 in the radial direction of the drill bit A2 are located at a tip end in the axial direction. Thus, the connecting ridge line 104 constitutes the cutting edge of the main cutting blade 101A of the drill bit A2.

First ends of the three connecting ridge lines 104, which are located on the radially inner side, are coupled to each other at the center O1 of the drill bit A when viewed from the bottom, and the center O1 is the rotation center when carrying out the drilling operation.

As shown in FIGS. 8 to 14, the flank 103 of each of the three main cutting blades 101A includes a first flank 103A at an outer circumference end portion (radially outer end portion) thereof and a second flank 103B on an inner circumference side (radially inner side) thereof. The first flank 103A and the second flank 103B are coupled to each other in the radial direction via a connection face 103C that is a curved face. Note that the connection face 103C does not have to be the curved face.

The first flank 103A includes a blade tip side flank 103a close to the cutting edge (connecting ridge line 104) of the main cutting blade 101A and a base end side flank 103b formed on the base end side of the blade tip side flank 103a.

Figure 14:
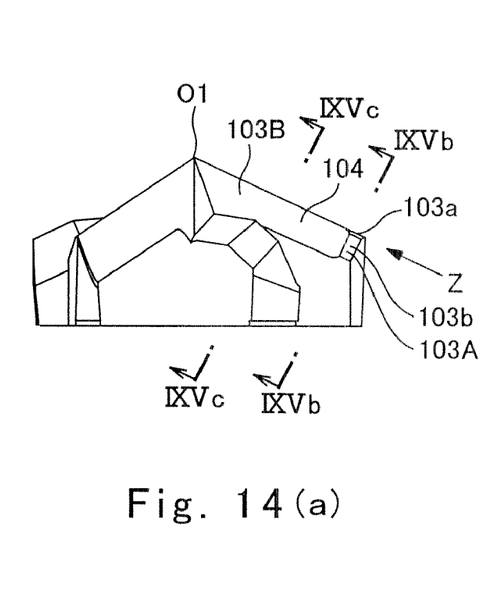
FIG. 14(a) is the same as FIG. 10 and is the side view of the above construction when viewed from a side of a flank orthogonal to a connecting ridge line.
FIG. 14(b) is a partially enlarged view showing tilt angles α1 and α2 of the flank when a cross section taken along line IXVb-IXVb shown in FIG. 14(a) is viewed from a direction indicated by an arrow Z (connecting ridge line direction)
FIG. 14(c) is a partially enlarged view showing a tilt angle α3 of the flank when a cross section taken along line IXVc-IXVc shown in FIG. 14(a) is viewed from the direction indicated by the arrow Z.

As with the cutting blade 1 shown in FIG. 7, the main cutting blade 101A of the drill bit A2 is constructed such that as shown in FIG. 14, the tilt angle α1 of the blade tip side flank 103a which is tilted toward the axial direction is smaller than the tilt angle α2 of the base end side flank 103b which is tilted toward the axial direction.

Moreover, in the present embodiment, the tilt angle α3 (see FIG. 14) of the second flank 103B which is tilted toward the axial direction is larger than each of the tilt angle α1 of the blade tip side flank 103a which is tilted toward the axial direction and the tilt angle α2 of the base end side flank 103b which is tilted toward the axial direction. However, the present invention is not limited to the above constructions, as long as the tilt angle α3 of the second flank 103B which is tilted toward the axial direction is larger than at least the tilt angle α1 of the blade tip side flank 103a which is tilted toward the axial direction. Therefore, the tilt angle α3 of the second flank 103B which is tilted toward the axial direction may be equal to or smaller than the tilt angle α2 of the base end side flank 103b which is tilted toward the axial direction.

Specifically, the tilt angles are preferably the same as those in Embodiment 1. However, these tilt angles are set suitably depending on the use, use condition, material, etc. of the drill bit A.

Also in the present embodiment, the tip end portion 110 of the drill bit A2 is formed of an integral block body, and its material is cemented carbide. Note that the tip end portion 110 of the drill bit A2 can, of course, also be made of a material other than cemented carbide.

Moreover, a shaft portion (not shown) of the drill bit is integrally fixed on the base end side (lower side in FIGS. 8 and 10) of the tip end portion 110 of the drill bit A2, the shaft portion being provided with a discharge groove formed to extend circumferentially and an attaching portion (shank portion) to be attached to a drilling device.

In the drilling operation, the drill bit A2 according to the present embodiment constructed as above can provide the same operational advantages as that according to Embodiment 1 by the same components as those in Embodiment 1, and can further provide the following operational advantages by the specific components in Embodiment 2. That is, since the rake angle of the cutting face 102 is set to be more acute-angled than the clearance angle of the second flank 103B of the main cutting blade 101A by providing the contacting face 120 at the above-described position, a so-called biting performance of the drill bit is excellent, and high cutting efficiency can be obtained. In addition, since the sub cutting blade 101B is provided as above, an object to be drilled crushed by the main cutting blade 101A can be effectively crushed, and the crushed pieces can be discharged from the above-described discharge groove to outside the drilled hole.

INDUSTRIAL APPLICABILITY

The present invention is applicable to a drill bit which is attached to a vibrating drilling device so as to be able to drill holes in stone, cement, etc.

The invention claimed is:

1. A drill bit comprising:
a plurality of cutting blades arranged in a circumferential direction thereof, the cutting blades being each structured to have a cutting edge formed by a connecting ridge line between a cutting face and a flank thereof; and a tip end portion formed by coupling radially inner ends of the cutting edges to each other at a center portion of a bit tip end when viewed from bottom,
wherein at least one of the cutting blades has a first flank at an outer circumference end portion thereof and a second flank at an inner circumference side portion thereof,
wherein the first flank has a blade tip side flank close to the cutting edge and a base end side flank formed on a base end side of the blade tip side flank,
wherein a tilt angle of the blade tip side flank which is tilted toward an axial direction is smaller than a tilt angle of the base end side flank which is tilted toward the axial direction, and
wherein a tilt angle of the second flank which is tilted toward the axial direction is larger than each of the tilt angle of the blade tip side flank which is tilted toward the axial direction and the tilt angle of the base end side flank which is tilted toward the axial direction.

2. The drill bit according to claim 1, wherein the cutting edges include first ends, and wherein the first ends are coupled to each other at a center of the bit tip end when viewed from bottom, and further wherein the first ends are located on a radially inner side.

3. The drill bit according to claim 1, wherein the drill bit comprises a cemented carbide material.

4. A drill bit comprising:
a plurality of cutting blades arranged in a circumferential direction thereof, the cutting blades being each structured to have a cutting edge formed by a connecting ridge line between a cutting face and a flank thereof; and a tip end portion formed by coupling radially inner ends of the cutting edges to each other at a center portion of a bit tip end when viewed from a bottom,
wherein at least one of the cutting blades has a first flank at an outer circumference end portion thereof and a second flank at an inner circumference side portion thereof,
wherein the first flank has a blade tip side flank close to the cutting edge and a base end side flank formed on a base end side of the blade tip side flank,
wherein a tilt angle of the blade tip side flank which is tilted toward an axial direction is smaller than a tilt angle of the base end side flank which is tilted toward the axial direction, and
wherein the cutting blades include a plurality of main cutting blades and a plurality of sub cutting blades, and each of the main cutting blades includes the first flank and the second flank.

5. The drill bit according to claim 4, wherein each of the plurality of sub cutting blades is provided between the main cutting blades adjacent to each other in a rotational direction, and each of the plurality of sub cutting blades is provided at unequal intervals in the circumferential direction with respect to the main cutting blades located on both sides of each of the plurality of sub cutting blades.

6. The drill bit according to claim 5,
wherein a radially inner end of the cutting edge of each of the plurality of sub cutting blades is located so as to be spaced apart from a center of the bit tip end toward the outer circumference when viewed from bottom, and
wherein a contacting face whose borders are defined by lines that are a ridge line formed by connecting the radially inner end of the cutting edge of each of the plurality of sub cutting blades and the center of the bit tip end when viewed from bottom, a concave line that is a connecting line between the contacting face and the cutting face of each of the plurality of main cutting blades adjacently located on a rear side of the contacting face in the rotational direction, and a line formed by connecting the radially inner end of the ridge line of the cutting edge of each of the plurality of sub cutting blades and a radially outer end of the concave line, the radially outer end of the concave line formed at a portion which is located between two main cutting blades adjacent to each other in the rotational direction and which is located on a radially inner side portion of an intervening one of the plurality of sub cutting blades provided between said two main cutting blades.

7. The drill bit according to claim 4, wherein the cutting edge of each of the plurality of sub cutting blades is provided so as to be located more rearward toward the base end side in the axial direction than the cutting edge of each of the plurality of main cutting blades.

* * * * *